(12) United States Patent
Holstine et al.

(10) Patent No.: US 11,560,232 B2
(45) Date of Patent: Jan. 24, 2023

(54) EJECTION MODE VERIFICATION SYSTEM

(71) Applicant: AMI Industries, Inc., Colorado Springs, CO (US)

(72) Inventors: Steven Holstine, Colorado Springs, CO (US); Tristan Likes, Colorado Springs, CO (US); John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 93 days.

(21) Appl. No.: 17/104,930

(22) Filed: Nov. 25, 2020

(65) Prior Publication Data
US 2022/0161936 A1  May 26, 2022

(51) Int. Cl.
B64D 25/10 (2006.01)
(52) U.S. Cl.
CPC ............................ B64D 25/10 (2013.01)
(58) Field of Classification Search
CPC .............................. B64C 1/32; B64D 25/10
See application file for complete search history.

(56) References Cited

U.S. PATENT DOCUMENTS

| | | | |
|---|---|---|---|
| 4,911,382 A | | 3/1990 | Aronne |
| 5,482,314 A | * | 1/1996 | Corrado ............ B60R 21/01536 701/45 |
| 9,523,985 B1 | * | 12/2016 | Barnes ................. G05D 1/0653 |
| 9,714,862 B2 | | 7/2017 | Erhel |
| 9,738,388 B2 | * | 8/2017 | Oleson ................... B60N 2/002 |
| 2017/0297725 A1 | * | 10/2017 | Campbell .............. B64D 25/10 |
| 2021/0222650 A1 | | 7/2021 | Benjamin et al. |

FOREIGN PATENT DOCUMENTS

| | | | |
|---|---|---|---|
| CN | 109573051 | 4/2019 | |
| EP | 3822168 | 5/2021 | |
| EP | 3974321 | 3/2022 | |
| GB | 2551425 | 12/2017 | |
| WO | 2005012088 | 2/2005 | |
| WO | WO-2013120142 A1 * | 8/2013 | ............. B60N 2/002 |

OTHER PUBLICATIONS

USPTO; Notice of Allowance dated Aug. 3, 2022 in U.S. Appl. No. 17/104,623.
USPTO; Notice of Allowance dated Aug. 17, 2022 in U.S. Appl. No. 17/104,623.
United Kingdom Intellectual Property Office, United Kingdom Search Report dated May 23, 2022 in Application No. GB2117019.6.
United Kingdom Intellectual Property Office, United Kingdom Search Report dated May 23, 2022 in Application No. GB2116797.8.
USPTO; Pre-Interview First Office Action dated Apr. 28, 2022 in U.S. Appl. No. 17/104,623.

\* cited by examiner

*Primary Examiner* — Justin M Benedik
(74) *Attorney, Agent, or Firm* — Snell & Wilmer L.L.P.

(57) ABSTRACT

A system for ejection mode verification may comprise: a first ejection seat; a second ejection seat; an ejection mode selector; and a controller configured to: compare a desired ejection mode with a selected ejection mode; and command an indicator to turn "ON" or "OFF" in response to comparing the desired ejection mode with the selected ejection mode.

16 Claims, 7 Drawing Sheets

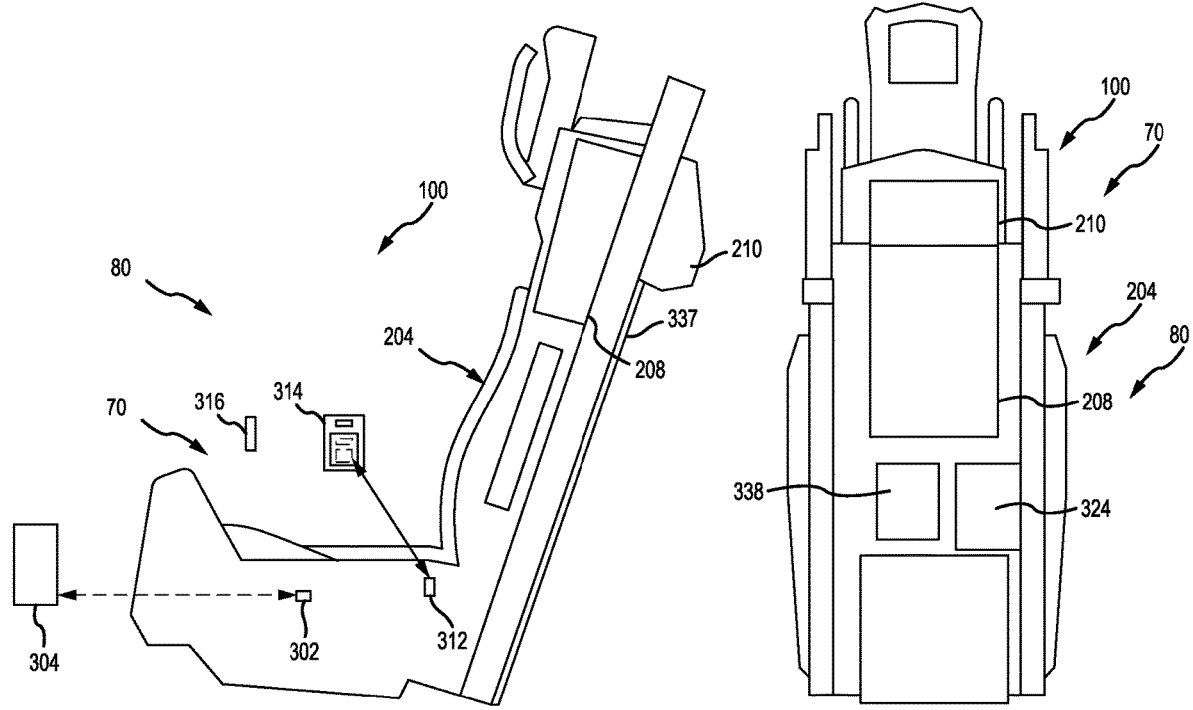

EJECTION MODE VERIFICATION SYSTEM

FIELD

The present disclosure relates to escape systems, and more specifically, to ejection mode verification for escape systems.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Dual occupant aircraft provide unique situations for escape systems as the second occupant may be an additional pilot or a non-pilot.

SUMMARY

A system for ejection mode verification is disclosed herein. The system may comprise: a first ejection seat; a second ejection seat; and a controller configured to: compare a desired ejection mode with a selected ejection mode; and command an indicator to turn "ON" or "OFF" in response to comparing the desired ejection mode with the selected ejection mode.

In various embodiments, the controller commands the indicator to provide an indication that the desired ejection mode does not match the selected ejection mode in response to the desired ejection mode not matching the selected ejection mode. The controller commands the indicator to provide an indication that the desired ejection mode matches the selected ejection mode in response to the desired ejection mode matching the selected ejection mode. The system may further comprise a user detection system configured to determine whether the second ejection seat is empty, whether the second ejection seat has a pilot, or whether the second ejection seat has a non-pilot. The controller may be in operable communication with a user detection system and the indicator. The system may further comprise an ejection mode selector configured to select an ejection mode for an ejection system. The selected ejection mode may be determined from the ejection mode selector, and the desired ejection mode may be determined from a user detection system. The indicator may provide a first indication in response to the selected ejection mode being a single pilot ejection mode and the second ejection seat having either a pilot or a non-pilot, and the indicator may provide a second indication in response to the selected ejection mode being a single pilot ejection mode and the second ejection seat is empty.

An ejection mode verification system is disclosed herein. The ejection mode verification system may comprise: an indicator; a user detection system; and a controller in operable communication with the indicator and the user detection system, the controller operable to: receive, via the user detection system, a desired ejection mode for an aircraft; receive, via an ejection mode selector, a selected ejection mode for the aircraft; compare the desired ejection mode to the selected ejection mode; and command the indicator to turn "ON" or "OFF" in response to comparing the desired ejection mode with the selected ejection mode.

In various embodiments, the user detection system is configured to determine whether an ejection seat is empty, whether the ejection seat has a pilot, or whether the ejection seat has a non-pilot. The user detection system may comprise an electronic port configured to communicate with an electronic device. The user detection system may be configured to determine whether a user is a pilot or a non-pilot in response to the electronic port communicating with the electronic device. The user detection system may include a connector for at least one of a helmet, a harness, a communication device, or an oxygen device. The user detection system may be configured to determine whether a user is a pilot or a non-pilot in response to analyzing a connector portion of the connector. The user detection system may comprise a microphone configured to detect a voice of a user. The user detection system may include an image sensor.

An article of manufacture is disclosed herein. The article of manufacture may include a tangible, non-transitory computer-readable storage medium having instructions stored thereon that, in response to execution by a processor, cause the processor to perform operations comprising: receiving, via the processor, a desired ejection mode of an ejection system with a first pilot in a first ejection seat and a second ejection seat that is empty, has a second pilot therein, or has a non-pilot therein; receiving, via the processor, a selected ejection mode of the ejection system; and comparing, via the processor, the selected ejection mode with the desired ejection mode.

In various embodiments, the operations may further comprise commanding, via the processor, an indicator to be "OFF" or "ON" in response to comparing the selected ejection mode with the desired ejection mode. The operations may further comprise: commanding, via the processor, the indicator to indicate the desired ejection mode does not match the selected ejection mode in response to the desired ejection mode not matching the selected ejection mode; and commanding, via the processor, the indicator to indicate the desired ejection mode matches the selected ejection mode in response to the desired ejection mode matching the selected ejection mode.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 3A illustrates a side view of an ejection mode verification system, in accordance with various embodiments;

FIG. 3B illustrates a back view of an ejection mode verification system, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
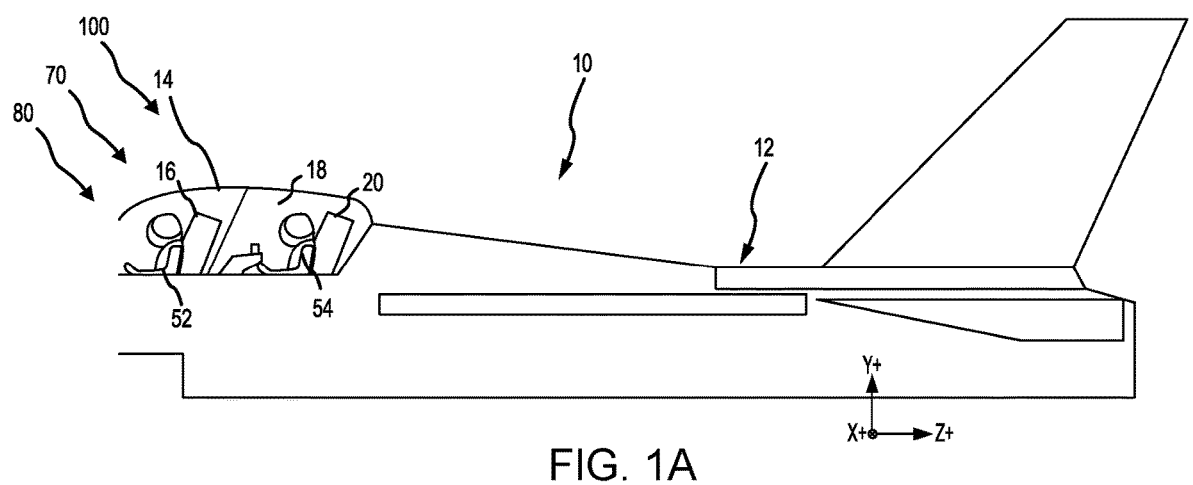
FIG. 1A illustrates an aircraft ejection system in a first occupant configuration, in accordance with various embodiments.

Referring now to FIG. 1A, an aircraft 10 having an ejection mode verification system 100 with dual pilot is illustrated, in accordance with various embodiments. The aircraft 10 may include a fuselage 12. The fuselage 12 may define or include a first cockpit 14 having a first ejection seat 16 and a second cockpit 18 having a second ejection seat 20. In various embodiments, the second cockpit 18 is fluidly isolated from the first cockpit 14. Although illustrated as including two separate cockpits 14, 18, the present disclosure is not limited in this regard. For example, a cockpit having the first ejection seat 16 and the second ejection seat 20 is within the scope of this disclosure. In various embodiments, by having separate cockpits (e.g., first cockpit 14 and second cockpit 18), the second ejection seat 20 may be ejected while the first ejection seat 16 may remain in the aircraft without exposing the pilot to air at the altitude of the aircraft 10.

In various embodiments, when the ejection mode verification system 100 has dual pilots, an indicator may be "OFF" when a user detection system determines both users are pilots. In various embodiments, the ejection mode verification system 100 is configured to detect whether the users are pilots or non-pilots. In this regard, upon detection of a first user being a first pilot, a second user being a second pilot, and an ejection system 70 set to a dual pilot ejection mode, the indicator would be "OFF". In a "dual pilot ejection mode," the ejection system 70 is configured to initiate a dual pilot ejection (e.g., eject the second pilot 54 followed by ejecting the first pilot 52) in response to either the first pilot 52 or the second pilot 54 initiating the ejection as described further herein. In various embodiments, the ejection mode verification system 100 would have an indicator "ON" when a user detection system determines there is only one user or when the user detection system determines there the first user is a pilot and the second user is a non-pilot. In this regard, the first pilot may be alerted by the indicator being "ON" when the ejection system is set to "dual pilot ejection mode" and there is only one pilot, in accordance with various embodiments. In such a situation, the first pilot 52 may be able to manually change the ejection system 70 to a correct mode (e.g., a single pilot mode or a dual occupant/single pilot mode) as described further herein.

Figure 1B:
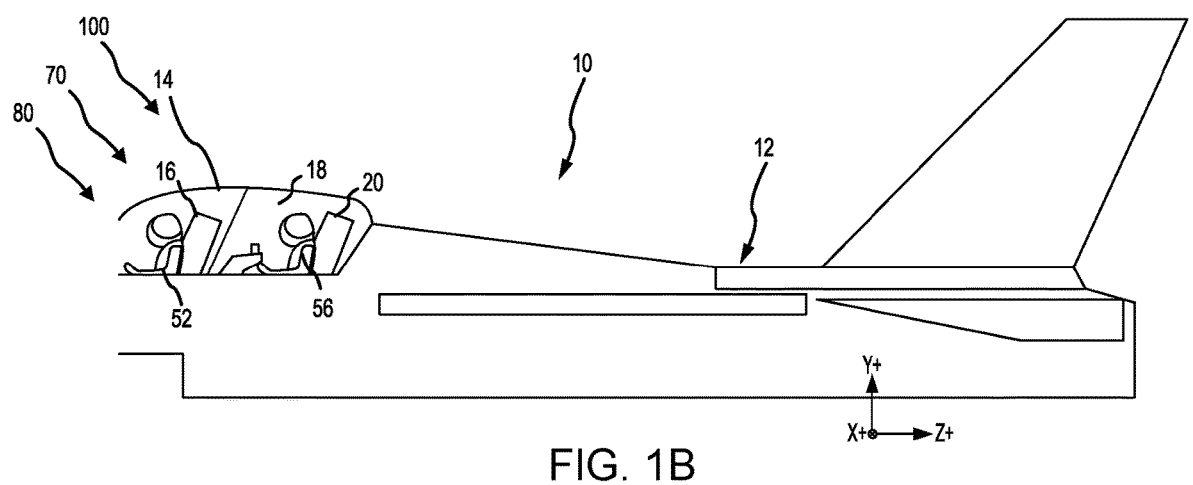
FIG. 1B illustrates an aircraft ejection system in a second occupant configuration, in accordance with various embodiments.

Referring now to FIG. 1B, the aircraft 10 having the ejection mode verification system 100 with dual users where a first user is a pilot and a second user is a non-pilot is illustrated, in accordance with various embodiments. In various embodiments, when the ejection mode verification system 100 has a first user as a pilot and a second user as non-pilot, the aircraft 10 includes a pilot 52 in the ejection seat 16 of the first cockpit and a non-pilot 56 in the ejection seat 20 of the second cockpit 18.

In various embodiments, when the ejection mode verification system 100 has a pilot 52 and a non-pilot 56, an indicator may be "OFF" when the user detection system 80 determines the first user is a pilot and the second user is a non-pilot. In various embodiments, the user detection system 80 is configured to detect whether the users are pilots or non-pilots. In this regard, upon detection of a first user being a first pilot, a second user being a second pilot, and an ejection system 70 set to a dual occupant/single pilot ejection mode, the indicator would be "OFF." In a "dual occupant/single pilot mode," the ejection system 70 is configured to initiate an ejection of only the second ejection seat (e.g., eject the non-pilot 56) in response to the non-pilot 56 initiating the ejection as described further herein, in accordance with various embodiments. In the "dual occupant/single pilot mode," the ejection system 70 is further configured to initiate an ejection of both occupants (e.g., the non-pilot 56 followed by the pilot 52) in response to the pilot 52 initiating the ejection. In this regard, the aircraft 10 may continue to have a pilot 52 if the non-pilot 56 accidently initiates an ejection event, and the aircraft will eject both occupants if the pilot 52 initiates the ejection, in accordance with various embodiments.

In various embodiments, the ejection mode verification system 100 would have an indicator "ON" when a user detection system determines there is only one user or when the user detection system determines the first user is a pilot and the second user is a pilot (e.g., as shown in FIG. 1A). In this regard, the pilot 52 may be alerted by the indicator being "ON" when the ejection system is set to "dual occupant/single pilot mode" and there is only one pilot or there is dual pilots, in accordance with various embodiments. In such a situation, the first pilot 52 may be able to manually change the ejection system 70 to a dual pilot mode as described previously herein or to a single pilot mode as described further herein.

Figure 1C:
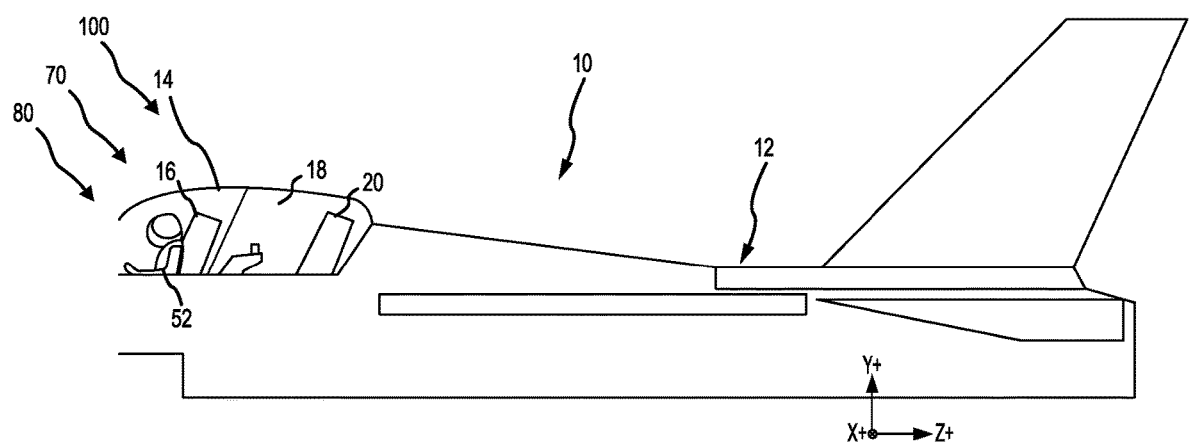
FIG. 1C illustrates an aircraft ejection system in a third occupant configuration, in accordance with various embodiments.

Referring now to FIG. 1C, the aircraft 10 having the ejection mode verification system 100 with a single pilot is illustrated, in accordance with various embodiments. In various embodiments, when the ejection mode verification system 100 has a first user as a pilot and the second ejection seat 20 is empty, a single pilot ejection mode may be desirable.

In various embodiments, when the ejection mode verification system 100 has a pilot 52 and the second ejection seat 20 is empty, an indicator may be "OFF" when the user detection system 80 determines the first user is a pilot and there is not a second user. In various embodiments, the user detection system 80 is configured to detect whether the users are pilots or non-pilots. In this regard, upon detection of a first user being a pilot 52, a second ejection seat 20 being empty, and an ejection system 70 set to a single pilot ejection mode, the indicator would be "OFF." In a "single pilot mode," the ejection system 70 is configured to initiate an ejection of only the first ejection seat (e.g., eject the pilot 52) in response to the pilot 52 initiating the ejection as described further herein, in accordance with various embodiments. In this regard, the second ejection seat 20 may not be ejected in a single pilot mode, and thus may not interfere with a descent of the pilot 52 when an ejection is initiated, in accordance with various embodiments.

In various embodiments, the ejection mode verification system 100 would have an indicator "ON" when a user detection system 80 determines there are two users (e.g., dual pilot as in FIG. 1A or a pilot 52 and non-pilot 56 as in FIG. 1B). In this regard, the pilot 52 may be alerted by the indicator being "ON" when the ejection system is set to "single pilot mode" and there are two occupants (e.g., two pilots as in FIG. 1A, or a pilot 52 and non-pilot 56 as in FIG. 1B), in accordance with various embodiments. In such a situation, the first pilot 52 may be able to manually change the ejection system 70 to either the dual pilot mode or the dual occupant/single pilot mode as outlined above.

Figure 2A:
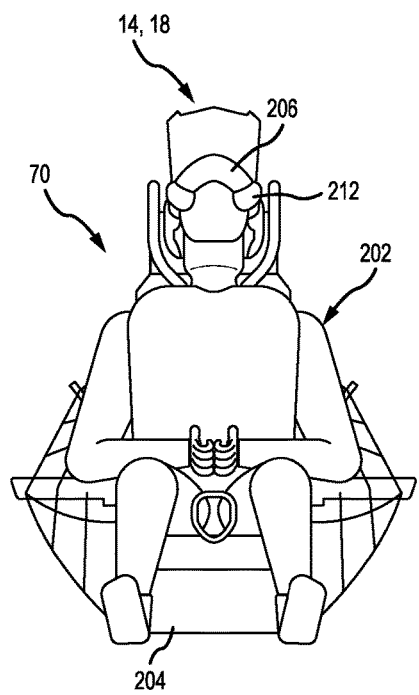
FIG. 2A illustrates a front view of an aircraft ejection system, in accordance with various embodiments.
Figure 2B:
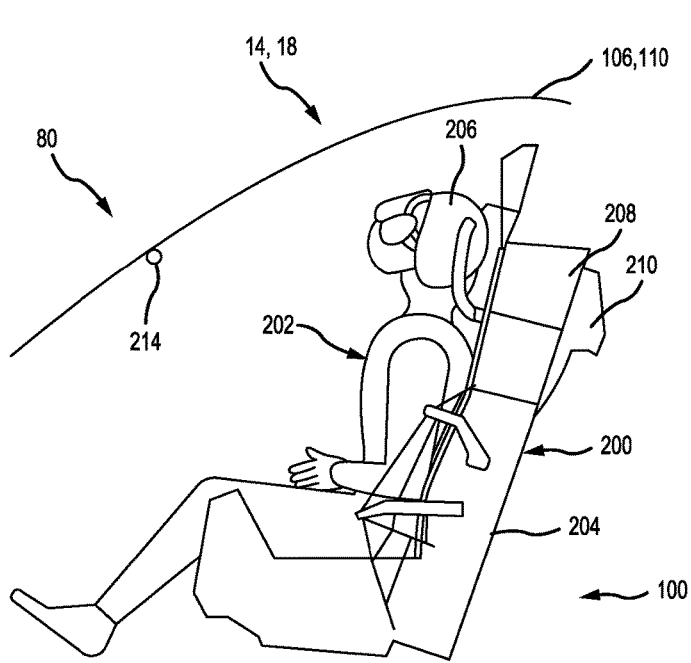
FIG. 2B illustrates a side view of an aircraft ejection system, in accordance with various embodiments.

Referring now to FIGS. 2A and 2B, an exemplary ejection system 70 may be included in the cockpit 14, 18. In particular, the ejection system 70 may include a seat 204 (e.g., ejection seat 16 or ejection seat 20) on which a user 202 (e.g., a pilot 52, a pilot 54, or a non-pilot 56 from FIGS. 1A-1C) may sit or otherwise rest and a helmet 206 which may be supported on the head of the user 202. The seat 204 may include various components of the ejection system 70 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

Referring now to FIGS. 2A, 2B, 3A, and 3B, the system 100 may provide an indicator display being "ON" if features of the ejection system 70 do not match passive detected data. "Passive detected data" may refer to any data that is detected by a sensor without an action performed by the user 202. For example, if a radio frequency identification (RFID) reader detects a RFID tag located on the user 202 as the user enters the cockpit 104, the data detected by the RFID reader (i.e., any data transferred to the RFID reader from the RFID tag) may be referred to as "passive detected data." In various embodiments, a non-pilot may wear gear including an RFID tag indicating the non-pilot is a non-pilot. Similarly, a pilot may wear gear including an RFID tag indication the pilot is a pilot. In this regard, the passive detected data may be an input for the ejection mode verification system 100 from FIGS. 1A-1C, in accordance with various embodiments.

The system 100 may include a controller 302. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

The system 100 may further include an indicator 304. The indicator 304 may be located on a same aircraft as the system 100. The controller 302 may communicate with the indicator 304 via any wired or wireless protocol. In that regard, the controller 302 may communicate data to the indicator 304. The controller 302 may perform a comparison between the passive detected data and a mode selection of the ejection system 70 as described further herein.

The system 100 may further include one or more sensor. For example, the sensor may include any one or more of a first image sensor 212, a second image sensor 214, or an electronic port 312. Each of the sensors may communicate with the controller 302.

The first image sensor 212 may be located on the helmet 206 and may detect data corresponding to a face of the user 202. The first image sensor 212 may include a camera, light detector, infrared detector, or any other image sensor capable of detecting image data corresponding to any wavelength of light. The image sensor 212 may be designed to detect image data corresponding to a biometric feature of the user. For example, the image sensor 212 may be configured to detect a retina scan of the user. As another example, the image sensor 212 may be configured to detect a face of the user. The controller 302 may receive the detected retinal scan or facial scan of the user and may perform a facial recognition algorithm or a retinal recognition algorithm to identify the user. That is, the controller 302 may determine a specific identifier of the user based on the detected facial scan or retinal scan. In various embodiments, when the scanner does not recognize a user, the user may be identified as a non-pilot (e.g., non-pilot 56 from FIG. 1B). In this regard, each pilot may have specific user data and/or user settings, whereas a non-pilot may not.

The second image sensor 214 may be located on another portion of the ejection system 70 away from the helmet 206 and may include a camera, light detector, infrared detector, or any other image sensor capable of detecting image data corresponding to any wavelength of light. For example, the second image sensor 214 may be located on the canopy 106 of the first cockpit 14 or the second cockpit 18. As another example, the second image sensor 214 may be located at an entrance location of the aircraft 10 of FIGS. 1A-1C, the first cockpit 14, and/or the second cockpit 18. The second image sensor 214 may detect a facial scan of the user 202 or a retinal scan of the user 202 in a similar manner as discussed above with reference to the first image sensor 212.

The electronic port 312 may be designed to communicate with at least one of a first electronic device 314 or a second electronic device 316 via a wireless protocol. For example, the electronic device 314 may be a portable computing device and may include a mobile telephone, a tablet, a laptop, or the like. For example, the electronic device 316 may include, for example, a RFID tag, a key fob, a near field communication (NFC) transmitter, or the like. For example, the electronic port 312 and at least one of the first electronic device 314 or the second electronic device 316 may communicate via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, a RFID protocol, a NFC protocol, or any other protocol capable of wireless transmissions.

The electronic port 312 may automatically communicate with at least one of the first electronic device 314 or the second electronic device 316 in response to the first electronic device 314 or the second electronic device 316 being located within range of the electronic port 312. In response to initiation of these communications (or in response to another action after such communications are established), the electronic port may be provided with information from the first electronic device 314 or the second electronic device 316. The information may include an identifier of the user 202 (e.g., whether the user is a pilot or a non-pilot).

In response to receiving a specific user identifier or determining the specific user identifier based on the received data at the electronic port 312, the controller 302 may compare the number and type of users to a selected mode for the ejection system 70. The controller 302 may command the indicator 304 to turn "ON" when the mode selected for the ejection system 70 does not match the number and type of users, in accordance with various embodiments. The controller 302 may command the indicator 304 to turn or remain "OFF" when the mode selected for the ejection system 70 matches the number and type of users."

Figure 4:
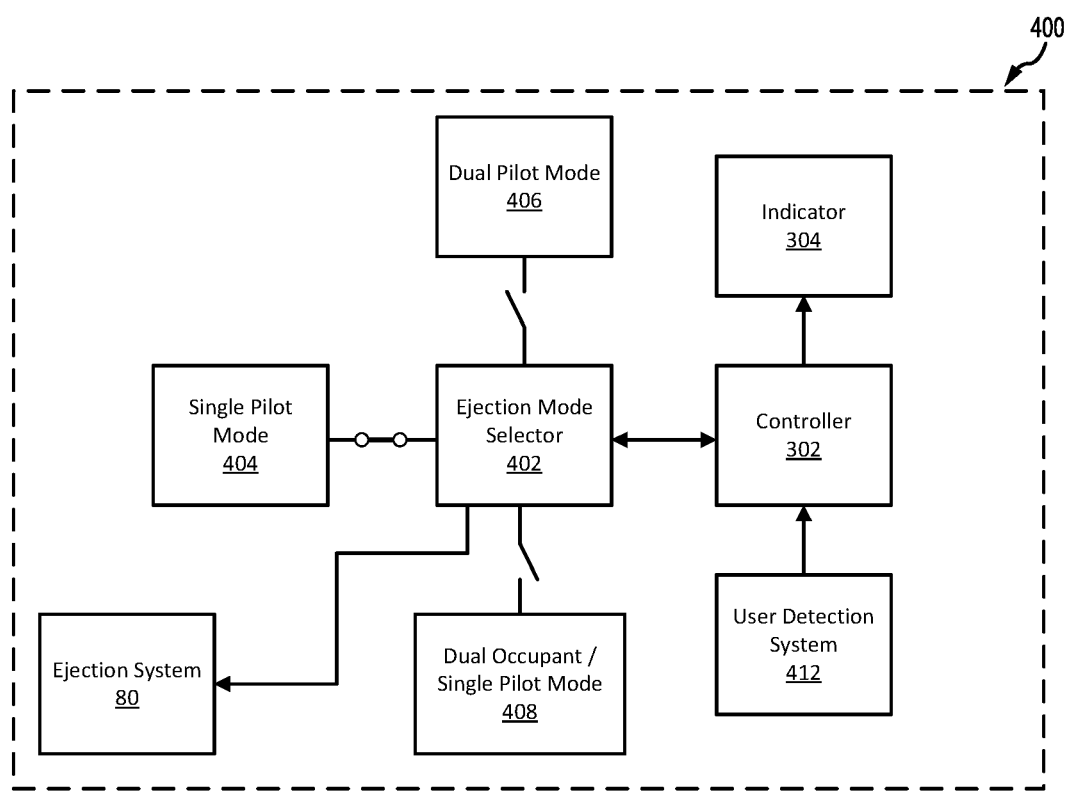
FIG. 4 illustrates a schematic view of a control system for an ejection system, in accordance with various embodiments.

Referring now to FIG. 4, a control system 400 for an ejection mode verification system 100 from FIGS. 1A-3B is illustrated, in accordance with various embodiments. In various embodiments, the control system 400 includes the controller 302, the indicator 304, and a user detection system 412. In various embodiments, the user detection system 412 is configured to detect whether the aircraft has dual pilot, a pilot and a non-pilot, or only a single pilot. In this regard, the user detection system 412 is configured to determine whether the second ejection seat 20 from FIGS. 1A-1C has a second pilot 54 (e.g., FIG. 1A), has a non-pilot 56 (e.g., FIG. 1B), or is empty.

In various embodiments, the control system 400 further comprises an ejection mode selector 402 in wired or wireless protocol communication with the user detection system 412, and in switchable communication with a single pilot mode 404, a dual pilot mode 406 and a dual occupant/single pilot mode 408. In various embodiments, the ejection mode selector 402 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the ejection mode selector 402 may further include any non-transitory memory known in the art. The memory may store instructions usable by the logic device to perform operations.

In various embodiments, a mode may be selected by a pilot (e.g., pilot 52 from FIGS. 1A-1C). In various embodiments, the ejection system 70 may only be in one mode at a time. For example, when the switch between ejection mode selector 402 and the single pilot mode 404 is closed, the remaining switches (e.g., switch between ejection mode selector 402 and dual pilot mode 406 is open and switch between ejection mode selector 402 and dual occupant/single pilot mode 408 is open). In this regard, the closed switch in the control system 400 may be configured to determine the operational mode of the ejection system, as described herein. In various embodiments, when the single pilot mode 404 is selected, the ejection system 70 is set in the single pilot ejection mode as described previously herein. When the dual pilot mode 406 is selected by a pilot, the ejection system 70 is set in the dual pilot ejection mode as described previously herein, in accordance with various embodiments. When the dual occupant/single pilot mode 408 is selected by a pilot, the ejection system 70 is set in the dual occupant/single pilot mode described previously herein, in accordance with various embodiments.

In various embodiments, the controller 302 is in electronic communication with the ejection mode selector 402 via a wired or wireless protocol, in accordance with various embodiments. In various embodiments, the controller 302 is configured to compare a selected mode of the ejection system 70 with an identified mode of the user detection system 412 and turn or remain "OFF" when the compared modes match. For example, when the user detection system 412 determines there is a single pilot, and the ejection mode selector 402 is in communication with the ejection system (e.g., the switch between the single pilot mode 404 and the ejection mode selector 402 is closed), the controller 302 would determine the selected mode and the identified mode match, in accordance with various embodiments. In various embodiments, when the identified mode matches the selected mode, the controller may command the indicator 304 to turn "OFF" or remain "OFF." Although described herein as having the indicator 304 being "OFF" in response to the modes matching, the present disclosure is not limited in this regard. For example, the indicator 304 may turn "ON" in response to the identified mode matching the selected mode, in accordance with various embodiments. Similarly, in various embodiments, an open switch, as opposed to a closed switch as described previously herein, may determine a selected mode.

In various embodiments, the controller 302 is configured to compare a selected mode of the ejection system 70 with an identified mode of the user detection system 412 and turn or remain "ON" when the compared modes do not match. For example, when the user detection system 412 determines there are dual pilot, and the ejection mode selector 402 is in communication with the ejection system (e.g., the switch between the single pilot mode 404 and the ejection mode selector 402 is closed), the controller 302 would determine the selected mode (e.g., single pilot mode 404) and the identified mode (e.g., dual pilot mode) do not match, in accordance with various embodiments. In various embodiments, when the identified mode does not match the selected mode, the controller may command the indicator 304 to turn "ON" or remain "ON." In this regard, the indicator 304 may allow a pilot (e.g., pilot 52 from FIGS. 1A-1C) to determine whether the pilot is in the correct ejection mode for the ejection system 70, in accordance with various embodiments.

In various embodiments, the user detection system 412 may be in accordance with the system of FIG. 3A-3B (e.g., electronic port 312 communicating with the electronic devices 314, 316 carried by a pilot and/or non-pilots). In this regard, when the aircraft includes dual pilot (e.g., FIG. 1A), information may be received by the controller 302 for use in determining whether the indicator 304 should be "OFF" or "ON" as described previously herein.

In various embodiments, the user detection system 412 may include a connector for a helmet, a harness, a communication device, an oxygen device, or the like that a pilot carries between aircraft. In this regard, the controller 302 may determine or identify information corresponding to the user (e.g., pilot 52 from FIGS. 1A-1C, pilot 54 from FIG. 1A, or non-pilot 56 from FIG. 1B) by analyzing the connector portion of the respective connector (which is carried by the pilot between aircraft and provided to a non-pilot prior to flight). Thus, the information corresponding to the pilot may be automatically learned by a controller of a cockpit of any aircraft with a system similar to the system 400 by analyzing the pin portion of the respective connector. Similarly, the fact that the second seat is occupied by a non-pilot may be determined by the controller of a cockpit of any aircraft with a system similar to the system 400 by analyzing the connector portion of the respective connector.

In various embodiments, the user detection system 412 may comprise a voice recognition algorithm configured to identify a user. For example, a microphone in the cockpit (e.g., cockpit 14 and/or or cockpit 18) or helmet 206 may be configured to detect a voice of a user. When the voice of the user is unidentifiable, the user detection system 412 may determine the user is a non-pilot and command the indicator 304 accordingly based on whether the mode determined by the user detection system 412 matches the selected mode.

In various embodiments, the user detection system 412 may include an image sensor, such as a camera, a light detector, an infrared detector, or any other image sensor capable of detecting image data corresponding to any wavelength of light. The image sensor may be designed to detect image data corresponding to a biometric feature of the user, such as a fingerprint scanner, a retina scanner, or the like. The controller 302 may receive the detected fingerprint or retina from the user and determine whether the user is a pilot based on the detected fingerprint scan or retina scan (e.g., the user is a pilot when the detected scan is known and the user is a non-pilot when the detected scan is unknown). In response to determining whether the user is a pilot or a non-pilot, the controller 302 may command the indicator 304 to be "ON" or "OFF" based on a comparison with the selected mode as described previously herein.

Figure 5:
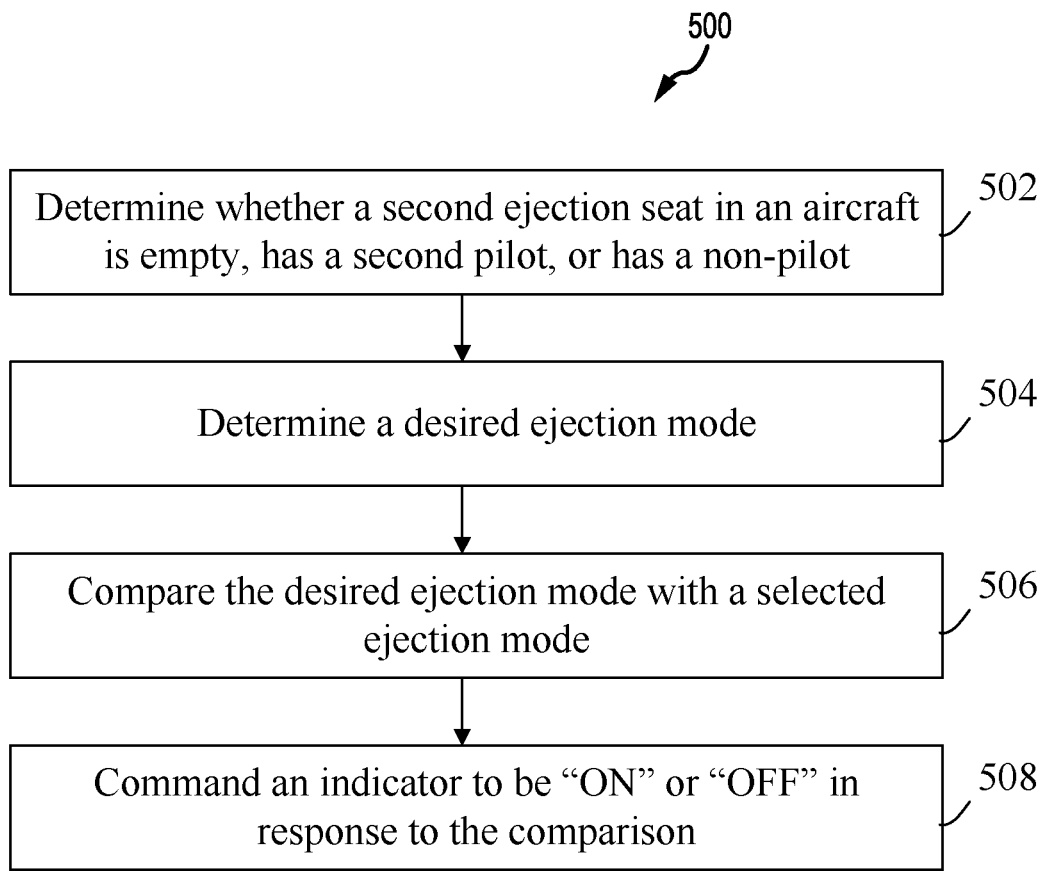
FIG. 5 illustrates a method for ejection mode verification, in accordance with various embodiments.

Referring now to FIG. 5, a flowchart illustrates a method 500 for indicating whether a selected ejection mode matches a desired ejection mode, in accordance with various embodiments. The method 500 may be performed by components of a system similar to the system 100 of FIGS. 2A, 2B, 3A, and 3B and/or system 400 of FIG. 4

In various embodiments, the method 500 comprises determining whether a second ejection seat in an aircraft is empty, has a second pilot, or has a non-pilot disposed therein (step 502). The determination may be made in accordance with the systems described above. In various embodiments, the method 500 further comprises determining a desired ejection mode for the ejection system (step 504). The desired ejection mode may be determined from a user detection system (e.g., user detection system 412 from FIG. 4).

In various embodiments, the method 500 may further comprise comparing the desired ejection mode with a selected ejection mode (step 506). A selected ejection mode may be a mode selected by a pilot of the aircraft (e.g., a single pilot ejection mode, a dual pilot ejection mode, or a dual occupant/single pilot mode), as described previously herein. In various embodiments, the method 500 may further comprise commanding an indicator to be "ON" or "OFF" in response to the comparison. For example, when the desired ejection mode matches the selected ejection mode, a controller may command the indicator to be "OFF". In this regard, a pilot may be notified the ejection mode selector 402 is in a correct mode. In various embodiments, when the desired ejection mode does not match the selected ejection mode, the controller may command the indicator to be "ON". In this regard, the pilot may be notified the ejection mode selector 402 is in an incorrect ejection mode and adjust the ejection mode accordingly.

In various embodiments, a control system 400 and method 500 as disclosed herein may provide redundancy to ensure an ejection mode selector 402 is in a correct ejection mode, in accordance with various embodiments. The control system 400 may be retrofitted to existing aircraft including an aircraft control system, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for ejection mode verification, the system comprising:
a first ejection seat;
a second ejection seat; and
a controller configured to:
compare a desired ejection mode with a selected ejection mode;
command an indicator to turn "ON" or "OFF" in response to comparing the desired ejection mode with the selected ejection mode;
command the indicator to provide a first indication that the desired ejection mode does not match the selected ejection mode in response to the desired ejection mode not matching the selected ejection mode; and
command the indicator to provide a second indication that the desired ejection mode matches the selected ejection mode in response to the desired ejection mode matching the selected ejection mode.

2. The system of claim 1, further comprising a user detection system configured to determine whether the second ejection seat is empty, whether the second ejection seat has a pilot, or whether the second ejection seat has a non-pilot.

3. The system of claim 1, wherein the controller is in operable communication with a user detection system and the indicator.

4. The system of claim 1, further comprising an ejection mode selector configured to select an ejection mode for an ejection system.

5. The system of claim 4, wherein the selected ejection mode is determined from the ejection mode selector, and wherein the desired ejection mode is determined from a user detection system.

6. The system of claim 1, wherein the indicator provides the first indication in response to the selected ejection mode being a single pilot ejection mode and the second ejection seat having either a pilot or a non-pilot, and wherein the indicator provides the second indication in response to the selected ejection mode being the single pilot ejection mode and the second ejection seat is empty.

7. The system of claim 1, wherein the controller is further configured to receive the desired ejection mode from a user detection system.

8. An ejection mode verification system, comprising:
an indicator;
a user detection system, the user detection system configured to determine whether an ejection seat is empty, whether the ejection seat has a pilot, or whether the ejection seat has a non-pilot; and
a controller in operable communication with the indicator and the user detection system, the controller operable to:
receive, via the user detection system, a desired ejection mode for an aircraft based on data received from the user detection system;
receive, via an ejection mode selector, a selected ejection mode for the aircraft;
compare the desired ejection mode to the selected ejection mode; and
command the indicator to turn "ON" or "OFF" in response to comparing the desired ejection mode with the selected ejection mode.

9. The ejection mode verification system of claim 8, wherein the user detection system comprises an electronic port configured to communicate with an electronic device.

10. The ejection mode verification system of claim 9, wherein the user detection system is configured to determine whether a user is the pilot or the non-pilot in response to the electronic port communicating with the electronic device.

11. The ejection mode verification system of claim 8, wherein the user detection system includes a connector for at least one of a helmet, a harness, a communication device, or an oxygen device.

12. The ejection mode verification system of claim 11, wherein the user detection system is configured to determine whether a user is the pilot or the non-pilot in response to analyzing a connector portion of the connector.

13. The ejection mode verification system of claim 8, wherein the user detection system comprises a microphone configured to detect a voice of a user.

14. The ejection mode verification system of claim 8, wherein the user detection system includes an image sensor.

15. An article of manufacture including a tangible, non-transitory computer-readable storage medium having instructions stored thereon that, in response to execution by a processor, cause the processor to perform operations comprising:
receiving, via the processor, a desired ejection mode of an ejection system from potential ejection modes, the potential ejection modes including a single pilot mode, a dual pilot mode, and a dual occupant/single pilot mode, the ejection system having a first pilot in a first ejection seat and a second ejection seat that is empty, has a second pilot therein, or has a non-pilot therein;
receiving, via the processor, a selected ejection mode of the ejection system from the potential ejection modes;
comparing, via the processor, the selected ejection mode with the desired ejection mode; and
commanding, via the processor, an indicator to be "OFF" or "ON" in response to comparing the selected ejection mode with the desired ejection mode.

16. The article of manufacture of claim 15, the operations further comprising:
commanding, via the processor, the indicator to indicate the desired ejection mode does not match the selected ejection mode in response to the desired ejection mode not matching the selected ejection mode; and
commanding, via the processor, the indicator to indicate the desired ejection mode matches the selected ejection mode in response to the desired ejection mode matching the selected ejection mode.

* * * * *